US007530403B2

(12) United States Patent
Cano

(10) Patent No.: US 7,530,403 B2
(45) Date of Patent: May 12, 2009

(54) TRANSPORT PUMPER

(75) Inventor: Miguel J. Cano, Hialeah, FL (US)

(73) Assignee: City of Hialeah, Hialeah, FL (US)

( * ) Notice: Subject to any disclaimer, the term of this patent is extended or adjusted under 35 U.S.C. 154(b) by 325 days.

(21) Appl. No.: 11/360,894

(22) Filed: Feb. 24, 2006

(65) Prior Publication Data

US 2006/0137886 A1 Jun. 29, 2006

(51) Int. Cl.

| | |
|---|---|
| ***A62C 27/00*** | (2006.01) |
| ***A01G 25/09*** | (2006.01) |
| ***B05B 9/00*** | (2006.01) |
| ***E01C 19/16*** | (2006.01) |
| ***E01H 3/02*** | (2006.01) |
| ***A61G 3/00*** | (2006.01) |

(52) U.S. Cl. .......................... 169/24; 169/52; 239/146; 239/147; 239/172; 296/19

(58) Field of Classification Search .................. 169/24, 169/51, 52; 239/146, 147, 172; 296/19
See application file for complete search history.

(56) References Cited

U.S. PATENT DOCUMENTS

| | | | | |
|---|---|---|---|---|
| 4,037,664 | A * | 7/1977 | Gibson | 169/15 |
| 4,678,041 | A | 7/1987 | Staudinger | |
| 4,830,421 | A * | 5/1989 | Hawelka et al. | 296/24.45 |
| 5,082,082 | A | 1/1992 | Hvolka | |
| 5,178,432 | A | 1/1993 | Zeman et al. | |
| 5,245,930 | A | 9/1993 | Williams | |
| 5,467,827 | A * | 11/1995 | McLoughlin | 169/24 |
| 5,573,300 | A | 11/1996 | Simmons | |
| 5,785,372 | A | 7/1998 | Glatzmeier et al. | |
| 6,029,750 | A | 2/2000 | Carrier | |
| 2003/0102685 | A1 | 6/2003 | Sioutis | |

OTHER PUBLICATIONS

Sioutis, George. WO 01/83036 A1, Nov. 8, 2001.*

* cited by examiner

*Primary Examiner*—Len Tran
*Assistant Examiner*—Ryan Reis
(74) *Attorney, Agent, or Firm*—Robert J. Van Der Wall

(57) ABSTRACT

The present invention discloses and claims a single vehicle that has both full fire fighting capability in the form of a pumper in permanent combination with full medical rescue and transport capability. Provided is a transport pumper of conventional design having a crew cab with four entrances, a large capacity fire pump, a tank containing a quantity of water, another tank containing a quantity of foam, a substantial length and diameter of fire hose, ground ladders, a side controlled pump operator's panel, and all other necessary equipment to be in substantial compliance with NFPA Standard 1901. Permanently provided on the same chassis as the pumper is an ambulance or rescue transport including rear entry double doors for patients, a rear dump capability, two supine patients on stretchers carrying capabilities, air conditioning, a side entrance door and all necessary equipment be in substantial compliance with federal standard KKK-A-1822E for a rescue transport. The rescue transport is modified only to the extent necessary to accommodate ground ladders and a hose bed on the top of the rescue transport. The vehicle concept is one of a modular design in permanent combination on a single chassis using standardized equipment already familiar to fire rescue personnel which can be readily refurbished and replaced with conventional equipment at minimized cost.

8 Claims, 6 Drawing Sheets

TRANSPORT PUMPER

BACKGROUND OF THE INVENTION

1. Field of the Invention

This invention relates to the field of fire rescue equipment, and more particularly to an apparatus that includes a fully equipped and complete ambulance, known in the industry as a "rescue transport," which is permanently combined in a single vehicle with a fully equipped and complete fire engine, of a type known in the industry as a "pumper." This permanent combination of what is has previouly been two separate vehicles on a single chassis provides full and complete functions for rescue transport and fire suppression. These functions are in substantial compliance with the requirements of National Fire Protection Standard 1901 ("NFPA 1901") for a fire suppression apparatus in the form of a pumper, in permanent combination on a single chassis with an ambulance or a rescue transport that is in substantial compliance with the requirements of Federal standard KKK-A-1822E. Compliance with these standards is important to both approval by governmental authorities for use of the invention in practice, and for sales purposes. However, since standards such as NFPA 1901 and KKK-A-1822E are revised from time to time, both of these standards should be viewed for purposes of this document as fixed in the form in which they existed on Apr. 5, 2004, the filing date of the parent of this application, and they are not claimed.

2. Description of the Prior Art

In many communities and cities in the United States the functions of fire fighting and emergency medical services with ambulance transport are combined into a single agency. That agency is mostly referred to as to "fire rescue." Frequently, its personnel receive exceptional training in dual disciplines, i.e., as emergency medical technicians or paramedics and as fire fighters.

These fire rescue agencies reside in facilities that are scattered about the political subdivision from which they are organized and employed. These facilities have historically been referred to as firehouses although they very frequently contain rescue transport vehicles commonly referred to as ambulances. To minimize response time, fire rescue personnel that are not volunteers reside in these firehouses when they are on duty.

In most communities, population densities vary significantly. In areas where there is a high population density, it is economical to purchase, maintain, and operate separate fire suppression and rescue transport vehicles because the usage rate justifies the capital cost, maintenance, and personnel expenses associated therewith. However, in outlying areas where the population density is much less, it is more difficult to economically justify the existence of separate vehicles for these vital functions, although heretofore there has been no choice. The fire rescue agency has the responsibility of supplying both emergency medical service/rescue transport and fire fighting capability to all areas of a community within a reasonable response time but the expense of doing that in separate vehicles in outlying areas is disproportionate on a per capita basis when compared to more densely populated areas. The present invention provides political subdivisions with a meaningful choice in whether to acquire and maintain separate vehicles for fire suppression and emergency medical service/rescue transport, or to combine those functions in a single vehicle with attendant significant economies.

So far as is presently known, there has not been any attempt to permanently combine complete rescue transport and complete pumper fire suppression functions in a single vehicle.

The only instance known to the present inventor from a pre-examination search of the prior art where those functions were sought to be combined even minimally in a single vehicle without task targeted alteration is Sioutis, U.S. patent application Ser. No. 2003/0102685 A1. Sioutis alleges to serve three functions, fire fighting, freeing and rescuing injured and trapped persons, and medical transport as an ambulance. Sioutis is especially designed for use with automobile accidents, having equipment to free people trapped in crushed vehicles and the ability to transport the injured after being freed. But its only fire suppression capability is a few fire extinguishers. In reality, all rescue transport vehicles carry one or more fire extinguishers anyway, and most carry equipment to free people trapped in crushed vehicles. Sioutis is not really a fire suppression piece of apparatus at all in the sense of NFPA 1901. It specifically lacks any pumper capability such as possessed by the present invention.

Another reference that addresses the notion of multiple functions in the fire, ambulance, and rescue fields is Simmons, U.S. Pat. No. 5,573,300. It teaches a utility vehicle having off road capability and a number modules that must be exchanged for different functions such as fire fighting or ambulance or rescue or tactical operations by law enforcement. Simmons does not purport to have the capability of rescue transport and fire suppression on the same vehicle at the same time without task targeted alteration. Recognizing that fires and trauma medical services are by their very nature emergencies requiring instant response, there is no time to be switching modules as is taught by Simmons.

Other references disclosed by the search are either rescue transport vehicles or fire suppression vehicles. For the record these include Williams, U.S. Pat. No. 5,245,930 and Zeman, et al., U.S. Pat. No. 5,178,432 as transporters, and Carrier, U.S. Pat. No. 6,029,750 and Staudinger, U.S. Pat. No. 4,678,041 as fire suppression vehicles. Other references of lesser interest are Glatzmeier, et al., U.S. Pat. No. 5,785,372 for a self supporting box structure for utility vehicles particularly fire fighting vehicles, Hawelka, et al., U.S. Pat. No. 4,830,421 and Hvolka, U.S. Pat. No. 5,082,082.

In the prosecution of the parent application of this invention, the Examiner cited several other references that were not discovered in the pre-examination search. The first of these is McLoughlin, U.S. Pat. No. 5,467,827. It teaches a modular fire truck having a flat bed that includes a conveyor for loading a number of interchangeable firefighting modules onto the bed. It does not teach the permanent combination of an ambulance (rescue transport) that can handle a plurality of patients on stretchers and a fire truck (pumper) at all. To the extent that it is a fire truck, it is very impractical because a fire is an emergency as noted above and there is not time to load and secure the modules disclosed in McLoughlin.

A second reference cited by the Examiner in the parent application is Gibson, U.S. Pat. No. 4,037,664 which teaches a fire fighting-foam producing module. This reference also entirely fails to teach anything about a fully equipped ambulance in permanent combination with a pumper on a single chassis.

None of the above cited references teach the true permanent marriage of a complete fire suppression pumper along with a complete rescue transport vehicle that both meet essentially all the standards applicable to each such apparatus with both being fixedly attached to a single chassis. For purposes of this document "fixedly attached" means permanently attached, and excludes the notion of task targeted alteration or replacement of the pumper and rescue transport modules, e.g., replacing a hose module with a tank module as taught in McLoughlin, U.S. Pat. No. 5,467,827.

SUMMARY OF THE INVENTION

Bearing in mind the foregoing, it is a principal object of the present invention to provide a vehicle that has full fire fighting capability in the form of a pumper in permanent combination with full medical rescue and transport capability.

Another principal object of the invention is to provide a modular design apparatus in three fixedly attached sections on a single chassis. It is comprised, first, of a crew cab for the driver and a group of fire/rescue fire fighters/emergency medical technicians, second, a standard pump and tank section having all the capabilities of a conventional NFPA 1901 standard compliant pumper, and, third, a section comprised a standard rescue transport compartment such as would be found behind the cab of a conventional rescue transport vehicle compliant with the federal standard KKK-A-1822E.

A related object of the invention is to provide in the fire suppression equipment a 1250 gallon per minute pump, a tank with a capacity to contain 500 gallons of water, another tank with a capacity to contain 20 gallons of foam, 1000 feet of five inch fire hose, ground ladders, and all other necessary equipment to be in substantial compliance with NFPA Standard 1901.

Another related object of the invention is to provide a rescue transport having rear entry double doors for patients, a rear dump capability, two patient carrying capabilities, air conditioning, a side entrance door and all other equipment to be in substantial compliance with Federal KKK-A-1822E requirements.

Another object of the invention is to exploit the versatility that the permanent marriage of two parts of emergency equipment provides featuring its fire suppression capabilities, its rescue transport capabilities, its command vehicle potential, its use in hazardous material applications, its use as a rehab vehicle, its ability to increase manpower capabilities, and its ability to maximize capital with multi-use capabilities.

A further object of the invention is to achieve maximum economies in the design, construction, purchase, and maintenance of the equipment, and minimized training expense. This is achieved by the use of a permanent modular design which allows easy refurbishment of any of the three sections, use of equipment that is standard and familiar to fire rescue agency personnel before beginning and interchangeability with multiple applications in the rescue compartment because of its standardized, conventional design.

For purposes of this application, the use of the terms "standard," "standardized" and "conventional" recognizes the reality that the design of such equipment constantly changes with new innovations, but it means whatever equipment that is normally employed at any given moment in time on rescue transport vehicles and pumpers that are separate rather than being permanently combined into a single vehicle. The point is to illustrate and emphasize that the permanent combination of a rescue transport and a pumper fixedly attached to a single chassis still allows the fire rescue personnel to use medical equipment and fire suppression equipment with which they are already knowledgeable and which is as complete as would be the case with separate conventional vehicles.

Other objects and advantages will be apparent to those skilled in the art upon reference to the accompanying descriptions and drawings.

In accordance with a principal aspect of the present invention, there is provided a pumper of present day conventional design having a crew cab with four entrances, a 1250 gallon per minute pump, a tank containing 500 gallons of water, another tank containing 20 gallons of foam, 1000 feet of 5 inch fire hose, ground ladders, a side controlled pump operator's panel, cartridge lay pre-connects and all other necessary equipment to be in substantial compliance with NFPA Standard 1901.

In accordance with a second principal aspect of the present invention, there is provided a rescue transport including rear entry double doors for patients, a rear dump capability that lowers the back of the vehicle to make ingress and egress with patients on stretchers much easier, two supine patient carrying capabilities, air conditioning, a side entrance door and all necessary equipment to be in substantial compliance with federal KKK-A-1822E standard for a rescue transport. That means the ability of on board emergency medical technicians to perform emergency medical procedures that include airway maintenance, ventilation, oxygenation, suction, cardiac monitoring/defibrillation, mechanized CPR, administration of intravenous fluids/medications, and the monitoring of blood pressure, all while the inventive vehicle is rushing the patient(s) to a hospital emergency room. The rescue transport is modified only to the extent necessary to accommodate ground ladders and a hose bed on the top of the rescue transport. The vehicle concept is one of a modular design in which each module is permanently and fixedly attached to a single chassis, and in which each module employs standardized and complete inventory of equipment already familiar to fire rescue personnel from their training and use on separate fire suppression and rescue transport vehicles. Such equipment can be readily refurbished and replaced with then conventional equipment, whether of the same or an improved design, at minimal cost. The permanent combination leads to extensive versatility and usefulness and includes its fire suppression capabilities, its rescue transport capabilities, command vehicle potential, ability to use the same in hazardous material applications, its use of a rehab vehicle, its ability to increase manpower capabilities, and its ability to maximize capital with the multi-use capabilities described.

The invention will be better stood upon reference to the following detailed description of the preferred embodiment and the appended drawings in which:

DETAILED DESCRIPTION OF THE PREFERRED EMBODIMENTS

Figure 1:
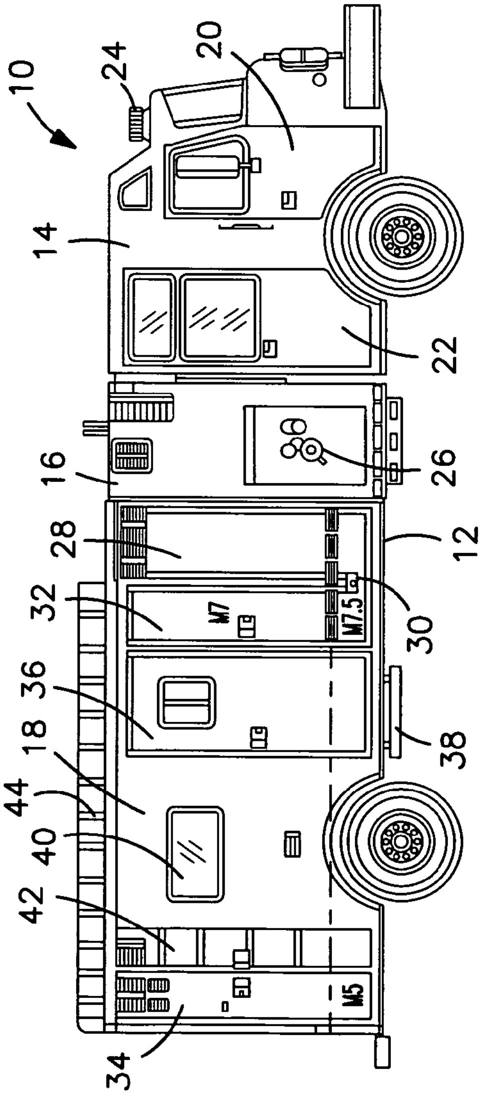
FIG. 1 is a right side elevation of the transport pumper showing the front and rear entrances to the crew cab, the Hale 1250 gallon per minute pump discharge, location of the 500 gallon poly water tank, exterior access storage lockers, side entrance door to the rescue transport, side window, roof access ladder, and ground ladder storage rack.

As required, detailed embodiments of the present invention are disclosed herein; however, it is to be understood that disclosed embodiments are merely exemplary of the invention which may be embodied in various forms. Therefore, specifics structural and functional details disclosed herein are not to be interpreted as limiting, but merely as a basis for the claims and as a representative basis for teaching one skilled in the art to variously employ the present invention in virtually any appropriately detailed structure.

NFPA Standard 1901 applies to new automotive fire apparatus designed for structural fire fighting or for supporting associated fire department operations. The standard specifies the minimum requirements for new automotive fire apparatus in 25 chapters. Some of these chapters include requirements for pumper fire apparatus, mobile phone fire apparatus, chassis and vehicle components, all-voltage electrical systems and warning devices, drive and crew areas, body, compartment and equipment mounting, fire pump and associated equipment, border tanks, line voltage electrical systems, command and communications, air systems, and winches.

For example, Chapter 14 relates to the fire pump and associated equipment. It provides that the pumping system shall be capable of delivering 100% of the rated capacity of the pump at 150 PSI net pump pressure, 70% of rated capacity at 200 PSI net pump pressure and 50% of rated capacity at 250 PSI net pump pressure. It also provides that for a pump rated at 1250 gallons per minute, as employed in the present invention, shall provide a minimum lift of 10 feet with a single suction line. The pump manufacturer is obligated to certify that the fire pump is capable of pumping 100% of rated capacity and 150 PSI net pump pressure from a draft through 20 feet of suction hose with a strainer attached under conditions that include an altitude of 2000 feet above sea level, an atmospheric pressure of 29.9 inches Hg, a water temperature of 60 degrees fahrenheit, and the like.

NFPA 1901 also requires that the fire pump engine be equipped with a supplementary heat exchanger cooling system with valving installed to permit water from the discharge side of the pump to cool the coolant circulating through the engine cooling system without intermixing. This heat exchanger is required to maintain the temperature of the coolant in the pump drive engine not in excess of the engine manufacturer's temperature rating under all pumping conditions. At least one drain is to be provided for allowing draining of the heat exchanger so to as prevent damage from freezing.

Chapter 14 of NFPA 1901 also provides the following controls and instruments that will be provided and installed as a group at the pump operator's panel:

1. A master pump intake pressure indicating device.
2. A master pump discharge pressure indicating device.
3. A pumping engine tachometer.
4. A pumping engine coolant temperature indicator.
5. A pumping engine oil pressure indicator.
6. A voltmeter.
7. The pump pressure control(s).
8. The pumping engine throttle.
9. The primer control.
10. The water tank to pump valve control.
11. The water tank fill valve control, and
12. The water tank level indicator.

The standard further provides that these instruments and controls are to be placed so as to keep the pump operator as far as practicable from all discharge and intake connections and in a location where they are visible and operationally functional while the operator remains stationary.

As indicated previously, the rescue transport substantially meets the requirements of Federal Standard KKK-A-1822E. Some examples of KKK-A-1822E requirements follow.

The standard covers certified, tested, commercial type Emergency Medical Services ("EMS") ambulances built on chassis that are suitable for the intended application and meet requirements stated in the standard. The ambulance is defined as a vehicle for emergency medical care which provides a driver's compartment, a patient compartment to accommodate an Emergency Medical Technician ("EMT")/paramedic and two litter patients (one patient located on the primary cot and secondary patient on a folding litter located on the squad bench) so positioned that the primary patient can be given intensive life-support during transit; equipment and supplies for emergency care at the scene as well as during transport; two-way radio communication; and, when necessary, equipment for light rescue/extrication procedures. The ambulance is to be designed and constructed to afford safety, comfort and avoid aggravation of the patient's injury or illness.

The aspect of the standard applicable to the present invention is a Type I vehicle with a configuration for Advance Life Support ("ALS"). This is a modular and transferrable ambulance body suited for mounting on a chassis. The standard contains extensive detailed specifications related to the chassis, engine controls performance, etc. Is generally in accordance with Federal Motor Vehicle Safety Standards ("FMVSS") that are not particularly notable for purposes of this specification. However, they are indicative of the detail to which the standard specifies requirements for the rescue transport module.

The standard specifies the volume of various interior storage accommodations in Paragraph 3.11.1 as follows: medicine dispensary cabinet(s) 6 cubic feet, medical supplies cabinet 9 cubic feet, linen supplies 4 cubic feet, trash receptacle compartment and sharps disposable container 2 cubic feet, oxygen installation (main) 6 cubic feet, oxygen unit (portable) 2 cubic feet, telemetry equipment 2 cubic feet, radio equipment & antenna 1 cubic foot, storage, miscellaneous 2 cubic feet, vacuum aspirator unit 1 cubic foot and heating and air conditioning as required. The standard further states the location of medical equipment and supplies shall be dictated by the relative importance and shall be readily accessible to the EMT. Priority should be given to items necessary to cope with life threatening conditions at the scene and in transit. The equipment and supplies necessary for airway maintenance, ventilation, oxygenation, and suction shall be at the head of the primary litter termed the "action area." The items for cardiac monitoring/defibrillation, mechanized CPR, administration of intravenous fluids/medications, and the monitoring of blood pressure are furnished and shall also readily available to the EMT at the action area. Supplies, devices, tools, etc. shall be stored in closed compartments and drawers design to accommodate the respective items.

The standard further specifies extrication equipment and storage in Paragraph 3.11.2.1 and requires a 12 inch wrench adjustable open end, a screwdriver 12 inch regular blade ("slot"), a screwdriver 12 inches Phillips type, a hacksaw with 12 wire blades (carbide), a pair of 10 inch pliers, a vice grip, and one pair channel lock pliers, a hammer of 3 pounds with a 15 inch handle, a flat head fire ax, a crowbar of 51 inches with a pinch point, a wrecking bar of 24 inches as a combination tool, a bow cutter of 36 inches with a jaw opening of 1 ¼ inches or greater, a power jack, a portable hydraulic and spreader tool kit which is hand powered and having a minimum of 4 ton capacity, a shovel with a pointed blade (folding type), a tin snip double action minimum of 8 inches, 2 ropes synthetic kernantle of 50 feet with ¾ inch diameter, 3 pairs of leather gauntlets gloves, 3 pairs of goggles of a clear eye protective type, 1 cold chisel and 1 center punch 12 inches by ½ inch, 1 cold chisel 1 inch×12 inches, 1 seat belt cutter, 2 utility knives with a curved blade, 1 rope, weighted, polypropylene 100 feet by ½ inch diameter, 1 pair of linemen's rubber glove with leather shells, 2 lights that are portable and are battery operated, 1 fire blanket and case 5 feet by 6 feet, 2 bailing hooks, 3 hard hats with face and eye protection, 1 spring loaded window punch, 12 hardwood shoring blocks 2 inches by 4 inches by 10 inches with rope handles, 4 hardwood cribbing blocks 4 inches by 4 inches by 12 inches with rope handles, 4 hardwood cribbing blocks wedge shape with rope handles, 1 come-along of 2 ton capacity with chain type with hooks, 2 alloy steel rescue pull chains 10 feet length minimum with grab hooks and rings, 1 gun kit, air cutting, with cylinder and chisels, 1 truck jack hydraulic with a 3 ton capacity, 2 extrication straps, with synthetic fabric and quick release buckles, and 1 extrication loop sling 1 inch wide nylon or equal having a 6 foot circumference with closure ring.

The standard further provides in Paragraph 3.12.1 that the ambulance shall have a hospital piped medical oxygen system capable of storing and supplying a minimum of 3000 liters of medical oxygen. The main oxygen supply with limited exceptions shall be from a single "M" sized cylinder which the ambulance purchaser is to provide and to install at the time the vehicle is placed in service. The cylinder controls must be accessible from both the inside and outside of the vehicle. The bottle pressure gauge or equivalent shall be visible from the EMT's seat and/or the squad bench. The oxygen bottle should be accessible to changing from the exterior of the body of the module. Access to the bottle when located under the squad bench, shall also be through the rear half of a two section squad bench cover.

A cylinder changing wrench shall be furnished, chained, and clipped with the oxygen cylinder compartment. The ambulance module manufacturer is required to install all of the components and accessories required for the pipe oxygen system which shall include, but not limited to, a pressure regulator preset to 50 plus or minus 5 PSI line pressure with non-ferrous piping and/or low pressure, electrically conductive, hose approved for medical oxygen at the flow rate specified in Paragraph 3.12.1.1. The use of industrial or welding type oxygen hose is prohibited. Oxygen piping shall be concealed and not exposed to the elements, securely supported through prevent damage, and be readily accessible for inspection and replacement. The oxygen outlet should be located within 35 inches from the center of the patient's head when in a supine position with the cot located in the position closest to the action wall. One of the outlets shall be for a flow meter/humidifier, and the second oxygen outlet is to be used for quick disconnect plug-in devices not requiring humidification.

The standard even provides precise specifications concerning the siren and public address system. In Paragraph 3.14.6, the standard provides for a combination electronics siren with integral public address system and other upgrading features including radio interface capability. Dual speakers are required to be installed outside the vehicle in a bumper/hood area. Speaker shall not protrude beyond the face of the bumper or bumper guards. The microphone is to be a noise cancelling type. Siren control shall permit the following sounds, manual, wail and yelp. Other applicable sounds such as rapid yelp, air horn or composite type sounds etc. may be specified or furnished. The system is to provide plug-in connections and connecting cables; with control capability from the passenger seat and a driver's horn ring by means of a siren\horn switch or, public address operation. The public address amplifier shall be independent of the two-way radio, except that a common microphone and control housing group may be employed. The illuminated (in siren mode) "Horn\Siren" switch shall be provided on the driver's console, or the siren may be switch automatically with the use of the emergency light switch.

The siren, with the exception of cancellation defects due to dual speakers, when tested in a full anechoic chamber that conforms to ANSI S1.13-1971, with test equipment and methods conforming to California Administrative Code, Title 13, Article 8, shall be capable of producing a continuous warning sign at a minimum level of 123 dB, A-weighted, 10 feet on access in the "wail" mode with "yelp" falling within 1 dba with 13.6 volts plus or minus 1% input at fundamental frequency in the range of 500 to 2000 Hz maximum. In the "wail" mode, the siren shall have a sweep rate of a 10-18 cycles per minute and in the "yelp" mode, a sweep rate of 150 to 250 cycles per minute. All sweep modes shall cover a range of at least 1 octave.

In voice (p.a.) operation, the unclipped sine wave output shall be at least 55 watts RMS into a resistor load matching the nominal speaker system impedance at 1000 Hz. The frequency response of the amplifier shall be 500 to 3000 Hz plus or minus 3 dB, when measured from 1000 Hz reference. Total harmonic distortion shall not exceed 10%, at 20 watts RMS, over the specified frequency range when measured with the load data shown above.

The foregoing are merely exemplary of the contents of these standards to illustrate how detailed and exacting these standards are. The foregoing standards are, of course, a matter of public record, and are far too lengthy for inclusion into the specification of this application in their entireties. The point of all the above descriptions in reference to the applicable NFPA 1091 and KKK-A-1822E standards is not to disclose or claim the standards, but to disclose and claim that the permanent combination of two fire rescue vehicles into one on a single chassis causes essentially no sacrifice in terms of capability of either the fire suppression or the rescue transport functions. No known reference or combination of references teach(es) or suggest(s) such a permanent and functionally complete combination vehicle. All of the known references at most teach removable modules or a tiny fraction of the capabilities of the present invention.

Reference is now made to the drawings, wherein like characteristics and features of the present invention shown in the various figures are designated by the same reference numerals.

FIG. 1 is a right side elevation of the transport pumper 10 of the present invention. The transport pumper is comprised of a chassis 12 and 3 modules, crew cab 14, pumper module 16, and rescue transport module 18, all of which are fixedly attached to chassis 12. Crew cab 14 includes front 20 and rear 22 doors to accommodate at least a crew of 4. Emergency lights 24 are also seen.

Immediately behind crew cab 14 is disposed the pumper module 16. It includes main fire pump discharge 26. A part of pumper module 16 is a vertical poly 500 gallon water tank 28, disposed immediately after the components containing the main fire pump and discharge 26. Tank 28 is especially designed as a vertical unit to conserve length in the vehicle.

Next in the sequence is the rescue transport 18 which includes a plurality of externally accessible lockers. The first of these is locker 30 located near the chassis at the front end of the rescue transport (marked M7.5). The second is accessible both from the exterior and interior and is locker 32 (marked M7). The third is locker 34 located in the right rear corner of the rescue transport is also accessible internally when (marked M5). Also seen are right side entrance door 36, external step 38, side window 40, roof access ladder 32, and ground ladder rack 44.

Figure 2:
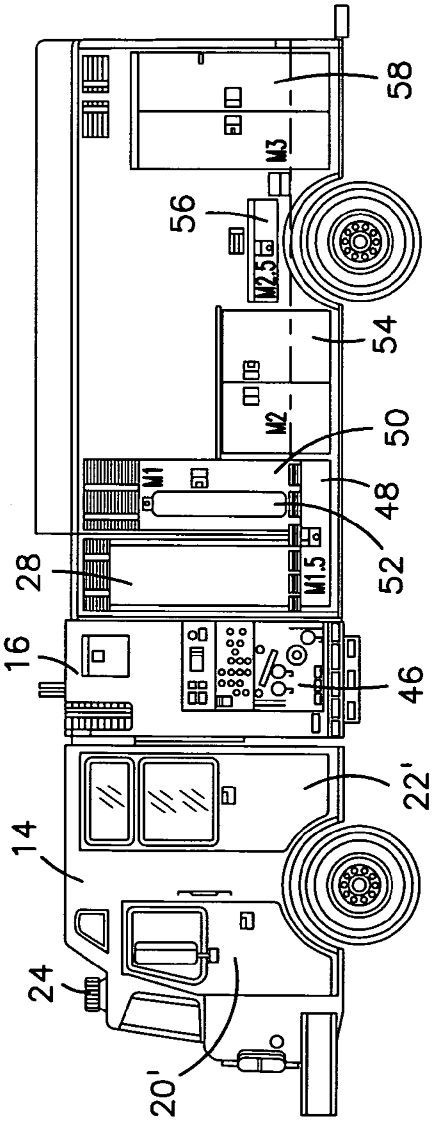
FIG. 2 is a left side elevation of the transport pumper also showing the front and rear entrances to the crew cab, the pump operator's panel, location of the 500 gallon poly water tank, rear rescue transport, additional external access storage lockers, and overhead hose bed.

FIG. 2 is a left side elevation of the transport pumper. In it are seen crew cab 14, with front 20' in rear 22' doors. The pumper operator control panel 46 is a part of the pumper module 16 after which is tank 28. Once again there are a plurality of externally accessible lockers, the first one 48 in down near the chassis again (marked M1.5) with second locker 50 (marked M1) containing primary oxygen cylinder 52, the third locker 54 (marked M2), the fourth locker 56 (marked M2.5) and the fifth locker 58 (marked M3). Of note is the incredible resemblence of the rescue transport 18 to a typical free standing modern ambulance.

Figure 3:
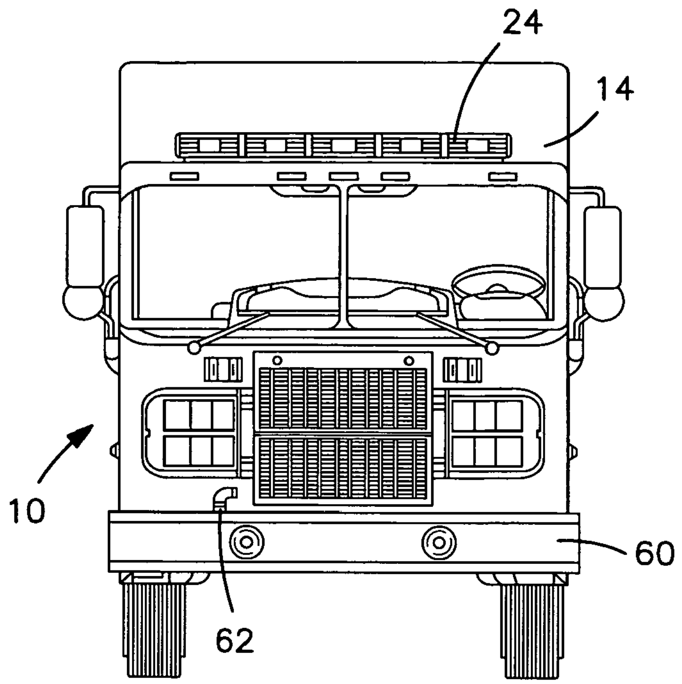
FIG. 3 shows a front view of the transport pumper with conventional crew cab with a conventional front suction fitting on the bumper.

FIG. 3 shows a front view of the transport pumper with crew cab 14, emergency lights 24, and front bumper 60 containing a five inch suction fitting 62.

Figure 4:
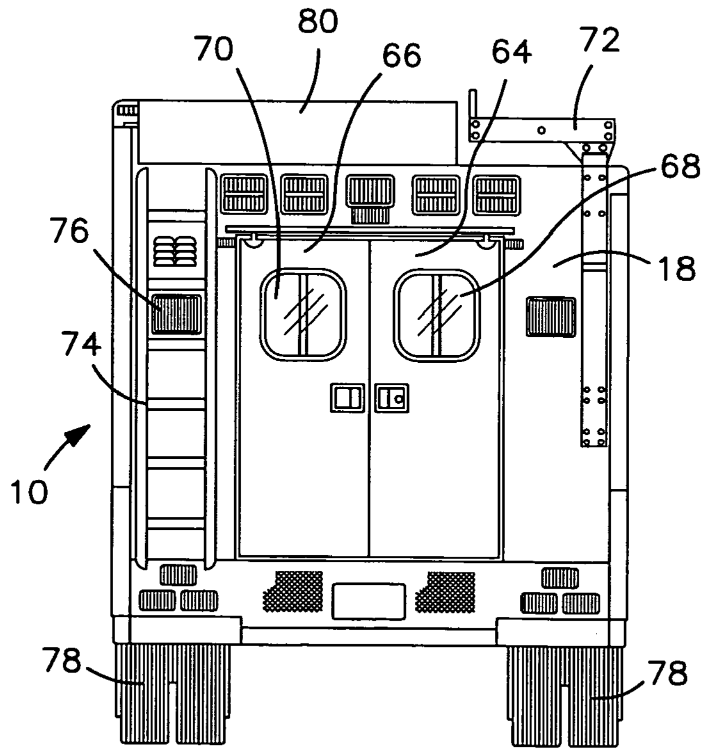
FIG. 4 is a rear view showing double door rear entry to the rescue transport.

FIG. 4 is a rear view of the transport pumper 10 and the rescue transport module 18. Seen are double patient entry doors 64 and 66, slidable windows 68 and 70, ground ladder rack 72, with access ladder 74, emergency lighting 76, dual rear wheels 78, and hose bed 80.

Figure 5:
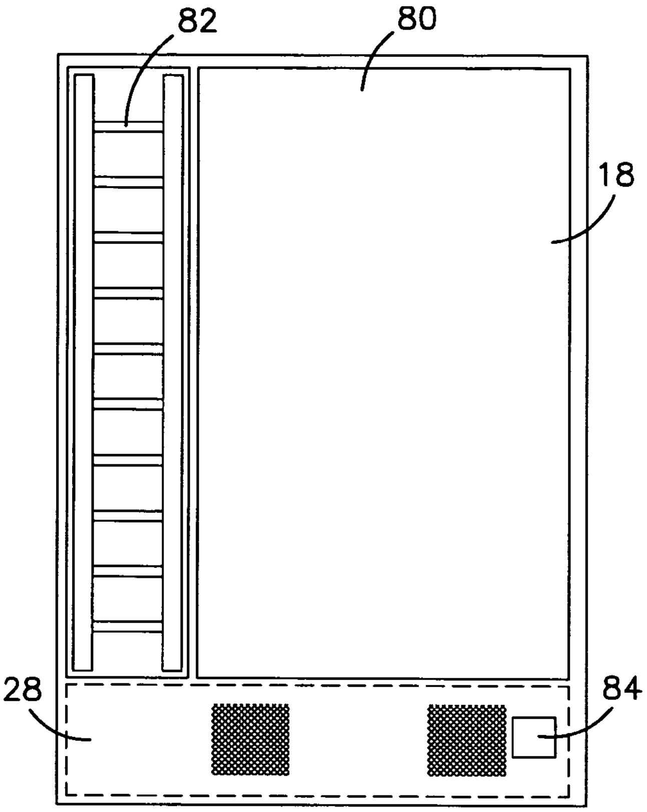
FIG. 5 is top plan view of the rescue transport module and water tank showing the tank fill door, hose bed and ground ladders.

FIG. 5 is a top plan view of the rescue transport module 18 and water tank 28. Seen are ground ladders 82, rubberlined hose bed 80, water tank fill door 84.

Figure 6:
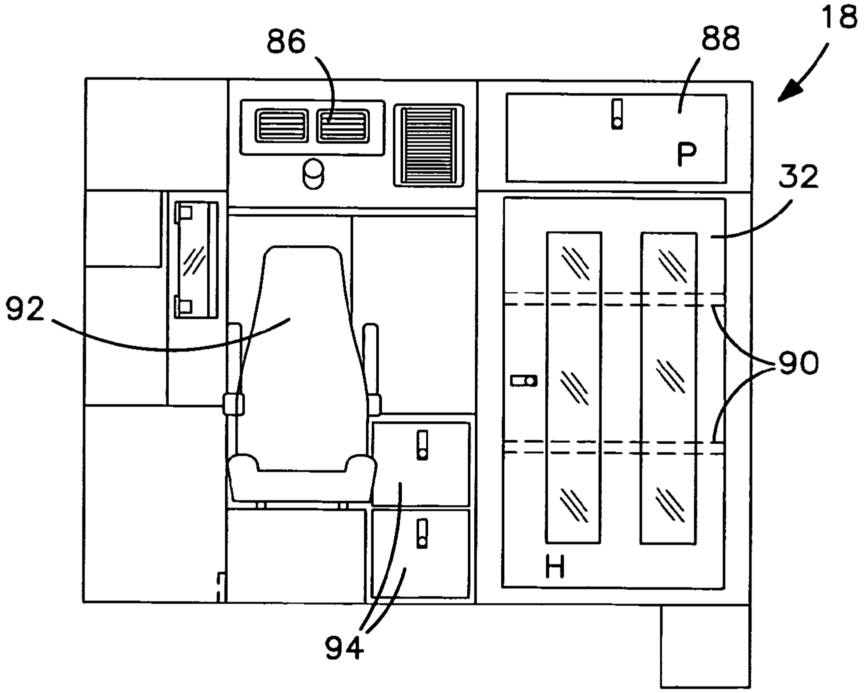
FIG. 6 is front facing view of the interior of the rescue transport showing the rear facing EMT seat, heating ventilating and air conditioning (HVAC) vents, interior access storage cabinets, and closet with adjustable shelves.

FIG. 6 is a front facing view of the interior of the rescue transport module 18. In it can be seen HVAC ducts 86, storage cabinet 88, interior access to closet 32 (marked in FIG. 1 as M7) having adjustable shelves 90, EMT chair 92 and storage drawers 94.

Figure 7:
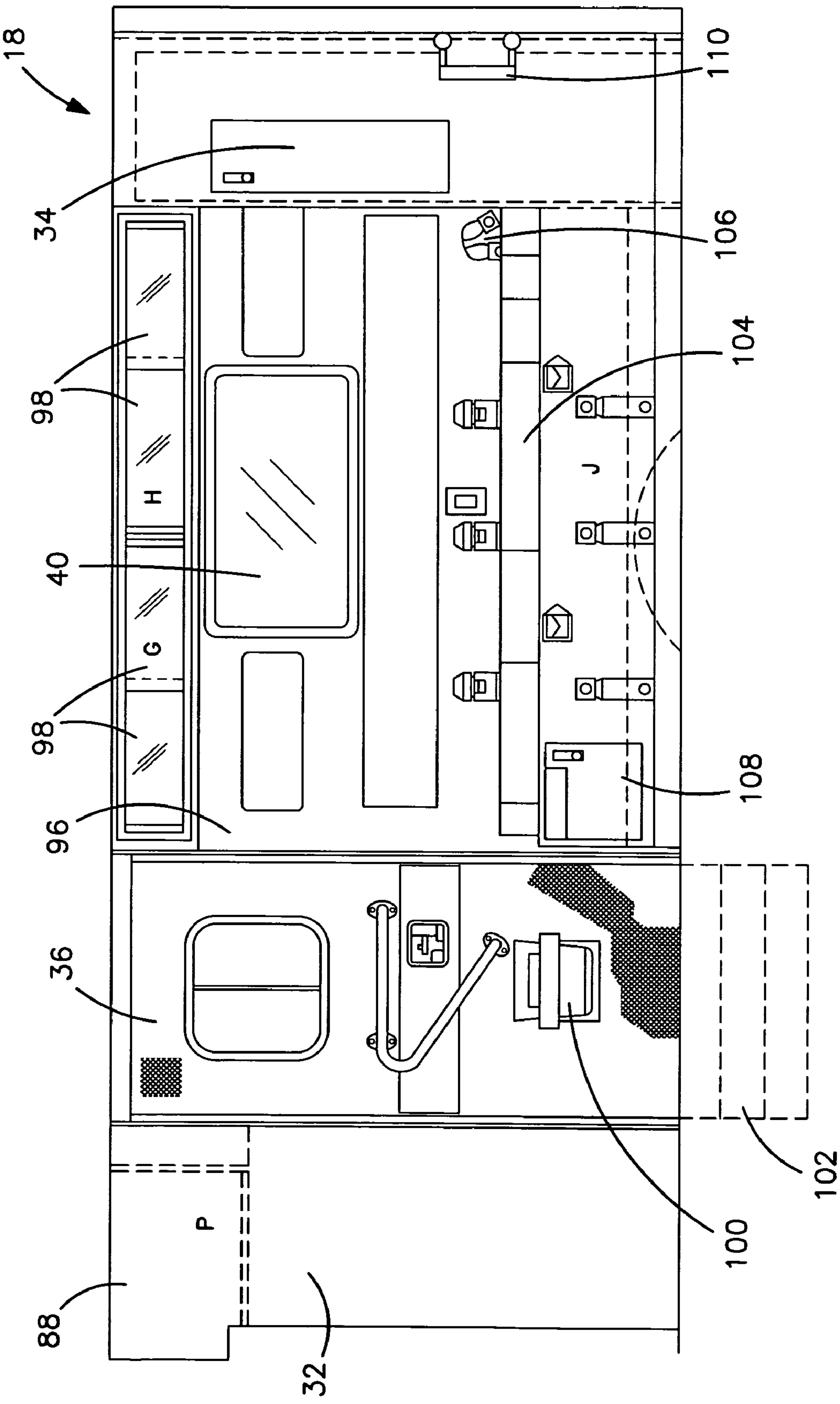
FIG. 7 is an interior view of the rescue transport illustrating the right side wall and showing side entrance door, squad bench used for secondary patient position, tilt out bio waste container, side window, and interior access closet.

FIG. 7 is an interior view of the rescue transport 18 illustrating the right side wall 96, plurality of storage cabinets 98. Also seen is right side window 40, side entrance door 36, supporting trash container 100, and steps 102 shown in phantom that lead down to the bottom of the side entrance door 36. Further seen is squad bench 104 also used for secondary patient support, with safety straps 106, sharps disposal 108, and rear door grab handle 110. Also seen are storage cabinet closet 32, storage cabinet 88 (marked M7 in FIG. 1), and a rear corner closet 34, which is also externally accessible (marked M5 in FIG. 1).

Figure 8:
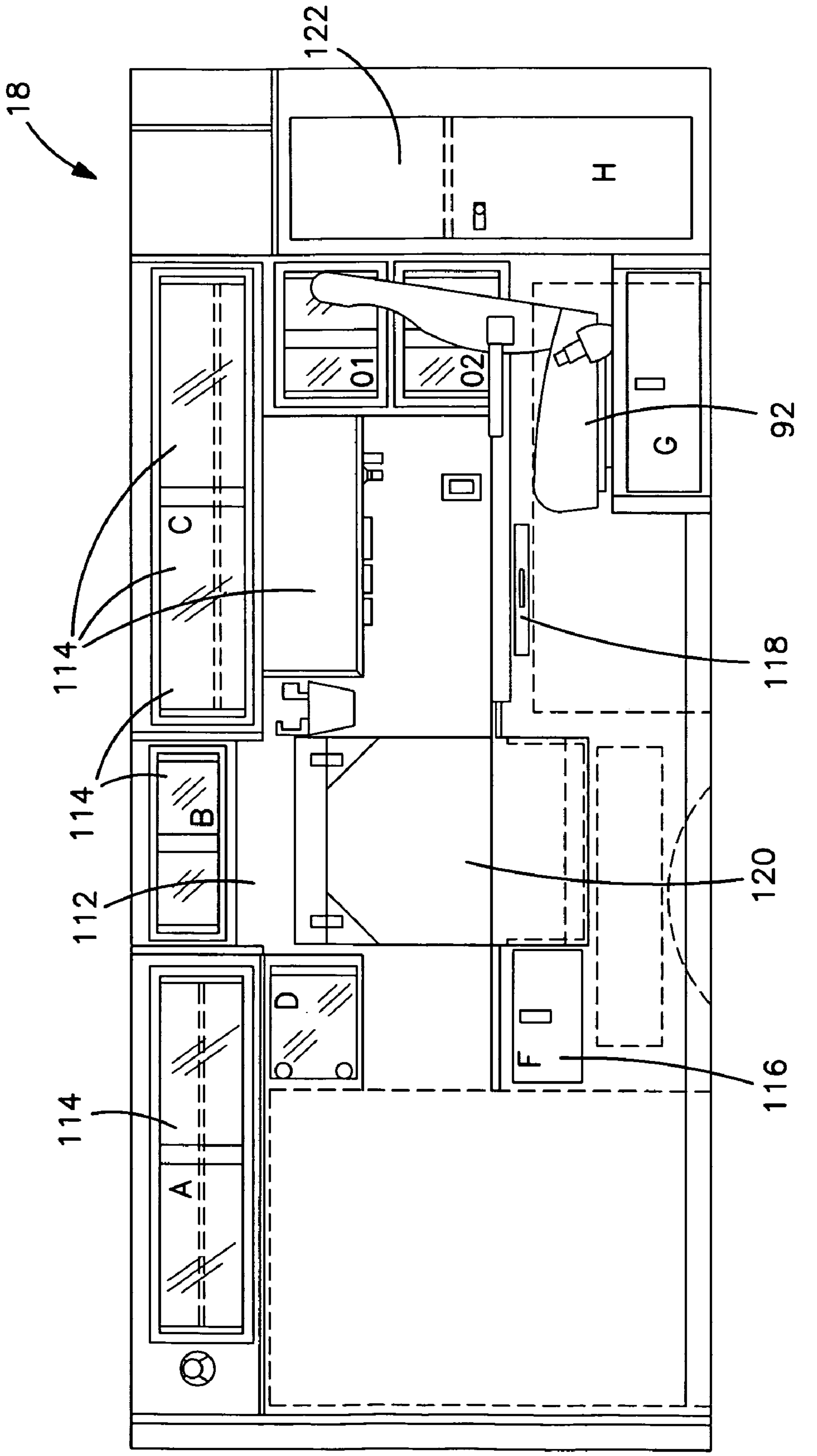
FIG. 8 is another interior view of the rescue transport illustrating the left side wall and showing the EMT chair, a multiplicity of storage cabinets and drawer, pull out writing tray, and fold down EMT seat.

FIG. 8 is another interior view of the rescue transport 18 illustrating the left side wall 112 and showing a multiplicity of storage cabinets 114, and drawer 116, the EMT chair 92, pull out writing tray 118, fold down EMT seat 120 and the interior access door 122 to second locker 50 containing the primary oxygen cylinder 52, as seen in FIG. 2.

Figure 9:
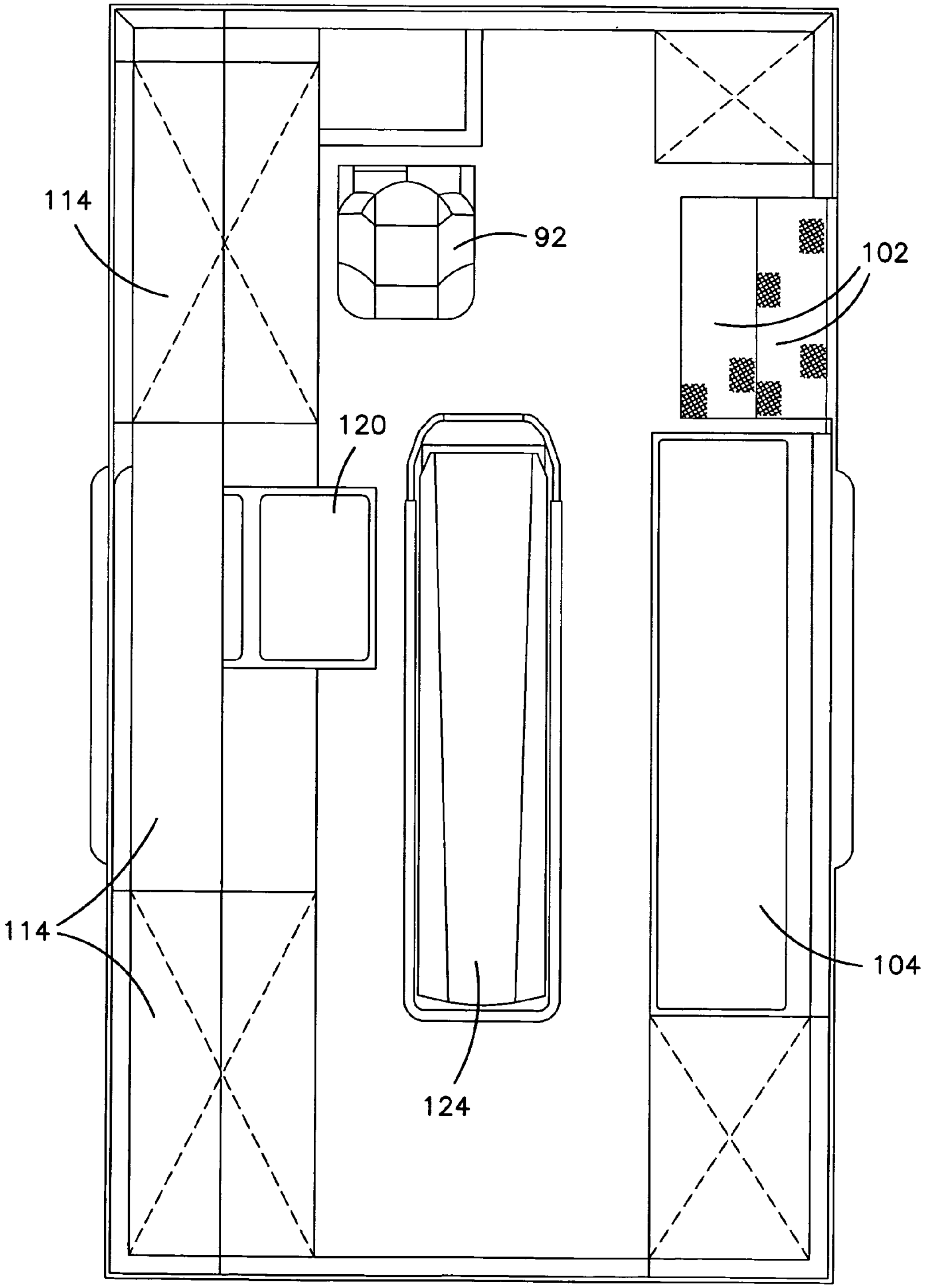
FIG. 9 is an overhead interior view of the rescue transport showing the primary patient stretcher, squad bench also used for secondary patient support, EMT chair, fold down EMT seat, overhead cabinets, and steps down to right side entrance door.

Finally turning to FIG. 9, illustrated is an overhead interior view of the rescue transport showing the primary patient stretcher 124, squad bench 104 also used for secondary patient support, EMT chair 92, fold down EMT seat 120, overhead cabinets 114, and steps 102 down to right side entrance door.

The transport pumper 10 has an extensive inventory of tools, equipment and supplies as mandated by the dual functions of emergency medical treatment and transport, and fire suppression, much of which is specified in the two applicable standards of KKK-A-1822E and NFPA 1901. To the extent that there is any overlap in the tools, equipment and supplies, some redundancies may have been eliminated. The inventory follows.

First in the crew cab: 3 Scott Paks, 4 hearing protectors, 4 safety vests, 4 stream lights, 4 traffic wand flashlights, 1 fuel card, 1 pair binoculars, 1 elevator key bag, 1 set zone keys, 2 trauma boxes, 1 O2 Bag, 1 AED, 1 KED, 1 set station keys, 1 radio adaptor headphones, assorted books {including 1 Emergency Response Guidebook, 1 Current Protocol Book (required by law), 1 Trailer Park Book, 1 1 ½" fog nozzle, 1 Current Drug Reference Guide, 1 hydrant book, 1 MIC Kit (orange bag) 1}, spare medical supplies, 4 isolation kits, complete Rit pack and (blue bag).

Next, at the front bumper: 1 5" soft suction hose, 1 storz to hydrant adapter, 2 storz spanner wrenches, 1 1 ½" fog nozzle, 1 jumpline with fog nozzle, 1 ½" gated wye.

Left Outside Compartment: 1 100' crosslay with fog nozzle, 1 200' crosslay with fog nozzle, 2 backboards, 2 spare scott bottles, 2 wheel chocks, 1 5" soft suction hose, 1 storz to hydrant adapter, 1 filter hose, 2 sections hard suction with a 6" male to storz adapter and strainer.

Compartment #1 M15: 1 4' pry bar, 1 5' pry bar, 2 brush brooms with handles, 2 squeegees with handles, 1 chain with hooks, 1 rubber mallet, assorted lubricant/fluids, 2 stortz spanner wrenches, 1 2 ½" double female, 1 2 ½" double male, 1 2 ½" to 1 ½" reducer, 1 1 ½" cap.

Compartment #2 M-7: 1 container Plug-N-Dyke, 1 air horn, 1 pair safety goggles, 1 pair neoprene gloves, 1 air hose with gauge, 1 hydrant wrench, 2 spanner wrenches, 1 K-tool, 1 radiation detection kit, 1 combustible gas detector, 1 5" storz cap, 1 2 ½" cap, 1 voltage tester, 1 roll scene tape, 1 roll duct tape, 1 bag with lock and chain, 1 T-handle, 1 heavy duty hacksaw, 1 glass-master saw, 1 tool box complete, 1 box with gas plugs and locks, 1 box with wooden plugs and wedges, 1 box with triangle reflectors, 1 steamer cap.

Tool Box M-7.5: 1 ball peen hammer, 1 center punch (test operations), 1 cold chisel, 1 electrical tape (roll), 1 flathead screwdriver small/medium/large, 1 Phillips screwdriver small/medium/large, 1 pliers (diagonal cutting), 1 vice grips, 1bolt cutters (small), 1 channel lock, 1 crescent wrench (12"), 1 fire line tape, 1 hack saw, 1 pliers, 3 spare blades for hack saw, 1 tool box complete.

Compartment #3 Inside crew cab: 1 AFFF extinguisher, 1 dry chem extinguisher, 2 spare Scott-paks w/pass alarms, 1 spare Scott bottle.

Compartment #4 M-7: 1 piercing nozzle, 1 hydro foam nozzle with eductor, 1 foam aspirating nozzle, 2 250 GPM fog nozzles, 1 pick head ax, 1 1250 GPM fog nozzle, 1 fan hanger bar, 2 fan hanger hooks, 1 2 ½" wye, 1 2 ½" to 1 ½" gated wye, 1 2 ½" double female, 1 flat head ax, 2 hose clamps, 1 fuel can, 1 2 ½" double mate, 1 2 ½" to 1 ½" reducer, 1 1 ½" double female, 1 1 ½" double male, 1 1 ½" to 1" reducer, 1 Akron 50 tool, 1 Kelly tool, 1 Claw tool, 1 Haligan, 1 sledge hammer, 1 bolt cutter, 1 exhaust fan.

Tailboard M-3: 1000 of 5" hose, 900" of 3" hose with double female, 1 hydrant wrench, 2 spanner wrenches, 4 traffic cones. Compartment #5 M-15: 1 50' twist-lock cords, 1 25' twist-lock cords, 1 25' house cord, 1 "Y" twist-lock adapter, 2 female house to twist lock adapter, 2 male house to twist lock adapter, 1 30 Amp "Y" twist adapter.

Right Outside Compartment M-3: 1 24' extension ladder, 1 14' roof ladder, 1 10' attic ladder, 1 6' pike pole, 1 8' pike pole, 2 spare Scott bottles, 1 hydrant wrench, 2 spanner wrenches, 2 stortz spanner wrenches, 1 5" soft suction hose, 1 stortz to hydrant adapter, 1 filler hose.

Compartment #6 M-3: various 5 gallon buckets, 2 salvage covers, reciprocating saw with pink extension cord, 2 flood lights, chain saw in case, absorbant pads, 1 200' electric cord with reel, assorted cribbing, absorbant, 1 air chisel kit with bottle connected to portable pack, 1 hydraulic jack, chaps and helmet.

Compartment #7 4 donut rolls, 2 150' rescue ropes, 1 150' high rise shoulder load with: spanner wrench, 2 ½" to 1 ½" reducer, breakaway nozzle, tyvek suits, 1 150' high rise shoulder load, 1 utility rope, 1-high rise pack with: assorted sprinkler wedges, 2 rubber door stops, 1 breakaway nozzle, 1 monkey wrench, 1 2 ½" to 1 ½" gated wye with 2 ½" pigtail, 1 seat belt strap. M-2: assorted splints, CID's, head vises, 1 CO2 extinguisher, 1 torpedo buoy, 2 dive tanks complete, 2 dive bags complete, 1 water cooler w/cup dispenser.

Under Bench Seat: 2 -BC with regulator, gauge, knife, center punch and trauma scissors, 1 100' nylon rope bag, 2 tank vest (line tender), 2 underwater lights, 2 wet suit and booties, 2 set of mask, snorkel, fins, 1 life vest (line tender), 2 tanks (80 cu. ft 2000 PSI Minimum), 2 weight belts, 2 strobe lights.

M-7: 1 flat shovel, 1 round shovel, 1 mop, 1 rubber mallet, 1 2 ½" double female, 1 2 ½" double male, 1 2 ½" to 1 ½" reducer, primer fluid.

Top Compartment: 1 hose controller, 1 deck gun with stream shaper, 1 spare foam, 1-set stacked tips: 2", 1 ¾", 1 ½" and 1 ⅜".

Next we turn to the Medical Box. Hereafter, the number of each item in the box precedes its name, while the number in parenthesis following its name indicates the number of spares carried on the truck: 3 Adenosine (4), 2 Albuterol (2), 1 Amiodarone (1) 1 Aspirin bottle (0), 2 Atropine (2), 2 Atrovent (2), 1 Benadryl (2), 1 Calcium Chloride (1), 1 Dextrose 50% (2), 1 Dopamine (1), 1 Epinaphrine 1:1,000 (mdv) (1), 4 Epinephrine 1:10,000 (4), 2 Furosemide (Lasix) (80 mg) (2), 1 Glucagon (1), 1 Labetalol (1), 2 Lidocaine 100 mg (2), 1 Lidocaine 2 gms/500 cc (4), 1 Magnesium Sulfate (0), 50 mg Morphine Sulfate (0), 2 Narcan (2), 1 Nitro Spray (1), 2 Normal Saline 100 cc (5), 2 Normal Saline 500 cc or 1000 cc (5), 1 Oral Glucose (1), 4 pills Plavix (0), 0 Ringers Lactate 1000 cc (4), 1 Sodium Bicarbonate (1), 2 Thiamine (2), 1 Tetracaine (1), 40 mg Valium (0), 30 mg Versed (0), 10 Alcohol Prep Pads (1 box), 1 box Ammonia Inhalants (2 boxes), 1 Blood Glucometer (0), 1 Blood Pressure cuff (1), 1 box Glucose Test Strips (0), 4 Saline Lock (8), 4 Saline Flush 10 cc (8), 3 Hypodermic Needle 18, 20 ga. (5), 3 Hypodermic Needle 21, 25 ga. (5), 1 IV Admin. Set 10 gtt. 1 (10), 2 IV Admin. Set 60 gtt. (4), 2 IV Cannula 14 ga. (4), 2 IV Cannula 16 ga. (4), 2 IV Cannula 18 ga. (6), 2, 2 IV Cannula 20 ga. (4, 4), 1 IV Handboard (adult) (10), 0 IV handboard (Pedi) (4), 4 lancets (1 box), 1 each adult & pediatric size Mucousal Atomizing Device (2), 3 tourniquet (3), 2 petroleum gauze (1 box), 1 portable needle disposal box (1), 1 Stethoscope (0), 2 Syringe 1 cc with needle (8), 1 Syringe 3 cc needle (8), 2 Syringe 5 cc (8), 2 Syringe 10 cc (8), 1 Syringe 30 cc (8), 10 Sponges 4"×4" non-sterile (2 bags), 1 tape ½" (4), 1 tape 1" (4), 1 Tape 2" (2), 1 tape 3" (2), 5 triple antibiodic ointment (1 box), 1 Dyn-0-Sheets (2), 2 Venigard adult (10), 1 Venigard junior (2), 1 Vomit/Urine Disposal Bags (2), 1 Interosseous Needle and 3-way stop cocks (2).

Misc. Equipment and Supplies on Truck: 1 hand sanitizer, 2 blankets (thermal absorbent reflective), 1 blood pressure kit, Multi (adult, child, infant), 4 backboards, 1 bulb syringe separate from OB kit, 3 Capnometer Zoll plastic sensor, 4 CID's or sandbags, 2 clipboards, 1 box ECG Electrodes for LP 11 and Zoll-Adult, 2 spare ECG paper Zoll and LP 11, 1 electronic thermometer Welch/Allyn, 4 emesis Basin, AMPLE gloves examination, 1 box hand cleaner dispenser, 1 life pak 11, 1 lock box key serial #, 1 Miller board with straps, 3 Motorola hand held radio & charger, 2 O.B. Kits, 4 O2 tank D—(small, portable size), 2 O2 tank D with regulator 1000 psi min., 3 O2 CPAP generator & circuit 1 O2 Tank "H" (large truck mount size) 500 PSI min., 1 box PEDI ECG Electrodes, 2 M.A.D. 1 Adult & 1 pedi, 1 set L.M.A. (all sizes), 1 box pedi ECG electrodes, 2 pillow with waterproof cover, 1 portable suction device, 2 posey restraints, 4 quick combo (physio model), 3 raincover yellow, 1 sharps disposal box, 2 each sheets, blankets, 2 splints (disposable) 12", 18", 24", 1 splint 54" padded, 4 No-Neck cervical collar, 1 each cervical collars, tall, regular, short, pedi, and baby no-neck, 1 box straps (backboard), 1 box T.B. masks, 16 Tyvek sleeves, 2 sterile water 1000 cc irrigation, 4 normal saline 1000 cc irrigation, 4 water gels dressing.

Airway Kit: (spares in parenthesis) 2 Batteries "C" cell (2), 1 BVM Adult (disposable) (2), 1 BVM Child (disposable) (2), 1 BVM Infant (disposable) (2), 1 decompression kit, 1 ET CO2 Detector (2), 2 each ET Tubes 5.5-8.0 (2 each), 2 E II Holder for adults & child (2), 1 Esophageal intubation detector (EID) (EDD)—The Blue Turkey Baster Device (2), 6 isolation mask (6), 1 intratracheal meconium suctioning device (1), 2 KY Jelly (2), 1 each Disposable Laryngoscope Blades Mac 2, 3, 4, Miller 1, 2, 3 (1 each), 1 Laryngoscope Handle (1), 1 LMA Kit (2), 1 Pertrach (0), 2 O2 Tubing (1), 2, 2 O2 Nasal Cannula (Adult) & (child) (2, 2), 2 O2 NRM (Adult) (6), 2 O2 Neubilizer Mask (6), 1 O2 Tank "D" with CPAP, regulator & 1000 psi minimum (0), 1 Offset forceps (1), 1 each Naso gastric tubes (NG tubes) 8, 12, 14, 16, French (1 each), 1 each nasophryngeal Airway (trumpet) 12, 14, 16, 18, 20, 22, 24, 26, 28, 30 French (1 each), 1 each Oropharyngoal Airways (OPA) (40, 50, 60, 80, 90, 100 mm) (1 each), 2 safety glasses, clear (2), 2 stylet (adult) (2), 1 Stethoscope (1), 1 each suction catheters 6-8, 10, 12, 14 (1 each), 2 syringe 10 cc (4), 1 syringe 60 cc catheter tip (for NG tube) (2), 1 tape ½" and 1" (2), 1 each Yankhauer suction handle and tube (1), 1 infant car seat, 1 Miller backboard, 1 Cot, 1 Stretcher (vehicle), 1 Backboard Straps (disposable), 1 Traction splint, 1 Wall Mount Suction, 1 Portable Suction Unit, 1 Current Protocol Book, 1 AutoVent Ventilation Device, 3 W.M.D.P.P.E. suits, 3 Mark I kits.

Miscellaneous Equipment: 1 Battery Jumper Cables, 2 each of Spare Recording paper for the Life pak 11 and Zoll Monitor, 1 roll of Rack & Sack Red Contaminated Waste Disposal Bags, 1 set of Special Entry Gate Keys (as required for zone), 4 pairs of Tyvek Coveralls (assorted sizes).

(2) Trauma Boxes: 2 Ace bandages (6), 1 each Adhesive Tape 1, 2, 3" (6 each), 1 Bottle of Normal Saline 1000 cc (2), 1 box Ammonia inhalants (1 box), 1 box Bandaids (1 box), 1 IV pressure infuser, 1 B/P Cuff (1), 2/4 Burn Sheets/Water Gel Dressings (2/4), 2 Cold packs (8), 2 Eye pads (8), 2 Eye Shields (0), 6 Kling (2 bags), 2 Penlight (0), 4 Pertrolatum gauze (6), 1 pkg Q-tips (1 pkg), 1 ring cutter (0), 1 trauma scissors (2), 20 sponges sterile 4"×4" (1 box), 1 stethoscope (1), 6 Surgi Pads 5"×9" (1 box), 2 triangular bandages (6), 1 Trauma pack dressing (2), 1 1000 cc LR or NS-IV bag (5), 1 10 drop administration set (2).

General: 1 Broselow Pediatric Organizer, 1 Capnometer, 1 Pediatric Immobilizer, 1 Folding Stretcher, 1 Infant Car seat, 1 Miller backboard, 1 Cot, 1 Stretcher (vehicle), 1 set Backboard Straps (disposable), 1 traction splint, 1 Wall Mount Suction, 1 Portable Suction Unit, 1 Current Protocol Book, 1 AutoVent ventilation device, 3 W.M.D.P.P.E. suits, 3 Mark I kits, 1 stair chair, 1 cardiac monitor.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. An emergency immediate response capital and manpower maximizing transport pumper comprising:

a chassis;

a crew cab for dual discipline trained EMT and firefighter personnel, the crew cab supported by and permanently attached to the chassis;

a complete and fully equipped pumper supported by and permanently attached to the chassis and disposed behind the crew cab and having a fire pump having a high volume per minute capacity, a water tank having a high volume capacity, a foam tank, a substantial length and diameter of fire hose, at least one ground ladder, and a control panel including a number of the following: a master pump intake pressure indicating device, a master pump discharge pressure indicating device, a pumping engine tachometer, a pumping engine coolant temperature indicator, a pumping engine oil pressure indicator, a voltmeter, pump pressure control (s), pumping engine throttle, a primer control, a water tank to pump valve control, a water tank fill valve control, and a water tank level indicator; and a supine patient and fully equipped rescue transport supported by and permanently attached to the chassis, disposed behind the pumper and having means to perform emergency medical procedures that include airway maintenance, ventilation, oxygenation, suction, cardiac monitoring/defibrillation, mechanized CPR, administration of intravenous fluids/medications, and the monitoring of blood pressure and heart rate by emergency medical technicians while enroute to a hospital emergency room, the rescue transport further comprising rear entry double doors for patients, a rear dump capability, two patient carrying positions, a side entrance door, and air conditioning;

whereby the transport pumper's owner maximizes capital and manpower utilization by combining medical rescue and fire suppression capabilities into one emergency vehicle.

2. The transport pumper of claim 1 in which the rescue transport has a body modified to accommodate a hose bed and ground ladders.

3. The transport pumper of claim 1 in which each of the crew cab, pumper, and rescue transport are modular in design permanently attached to a single chassis, to facilitate maintenance, refurbishment, replacement, and training.

4. The transport pumper of claim 1 which includes equipment for fire suppression, rescue transport, command vehicle, hazardous materials applications, rehab vehicle, and increased manpower utilization.

5. An emergency immediate response capital and manpower maximizing transport pumper having a chassis and crew cab comprising:

the crew cab being staffed by dual discipline trained EMT and firefighter personnel;

a fully equipped pumper permanently attached to the chassis behind the crew cab and having a fire pump having a high volume per minute capacity, a water tank having a high volume capacity, a foam tank, a substantial length and diameter of fire hose, at least one ground ladder, and a control panel including a number of the following: a master pump intake pressure indicating device, a master pump discharge pressure indicating device, a pumping engine tachometer, a pumping engine coolant temperature indicator, a pumping engine oil pressure indicator, a voltmeter, pump pressure control(s), pumping engine throttle, a primer control, a water tank to pump valve control, a water tank fill valve control, and a water tank level indicator; and a supine patient fully equipped rescue transport permanently attached to the chassis behind the pumper and having means to perform emergency medical procedures that include airway maintenance, ventilation, oxygenation, suction, cardiac monitoring/defibrillation, mechanized CPR, administration of intravenous fluids/medications, and the monitoring of blood pressure and heart rate by emergency medical technicians while enroute to a hospital emergency room, the rescue transport further comprising rear entry double doors for patients, a rear dump capability two patient carrying positions, a side entrance door, and air conditioning;

whereby the transport pumper's owner maximizes capital and manpower utilization by combining medical rescue and fire suppression capabilities into one emergency vehicle.

6. The transport pumper of claim 5 in which the rescue transport has a body modified to accommodate a hose bed and ground ladders.

7. The transport pumper of claim 5 in which each of the crew cab, pumper, and rescue transport are modular in design permanently attached to a single chassis,to facilitate maintenance, refurbishment, replacement, and training.

8. The transport pumper of claim 5 which includes all in a single vehicle full time equipment for fire suppression, rescue transport, command vehicle, hazardous materials applications, rehab vehicle, increased manpower utilization.

* * * * *